(12) United States Patent
Senthil et al.

(10) Patent No.: US 8,682,527 B2
(45) Date of Patent: Mar. 25, 2014

(54) COOLING SYSTEM COMPRESSOR WITH VARIABLE OPERATING RANGE

(75) Inventors: Sudha Senthil, West Bloomfield, MI (US); Robert Wunsche, Clarkston, MI (US); Curtis G. Vincent, Rochester Hills, MI (US); James R. Reed, Swartz Creek, MI (US)

(73) Assignees: DENSO International America, Inc., Southfield, MI (US); GM Global Technology Operations LLC, Detroit, MI (US)

( * ) Notice: Subject to any disclaimer, the term of this patent is extended or adjusted under 35 U.S.C. 154(b) by 320 days.

(21) Appl. No.: 13/076,213

(22) Filed: Mar. 30, 2011

(65) Prior Publication Data

US 2012/0253592 A1 Oct. 4, 2012

(51) Int. Cl.
*G06F 7/00* (2006.01)
(52) U.S. Cl.
USPC .......................................................... 701/36
(58) Field of Classification Search
None
See application file for complete search history.

(56) References Cited

U.S. PATENT DOCUMENTS

| | | | |
|---|---|---|---|
| 5,924,296 A | 7/1999 | Takano et al. | |
| 6,367,270 B2 | 4/2002 | Niimi et al. | |
| 2001/0049943 A1* | 12/2001 | Nakamura et al. | 62/176.6 |
| 2006/0162359 A1* | 7/2006 | Fujiki et al. | 62/236 |

* cited by examiner

*Primary Examiner* — Thomas Tarcza
*Assistant Examiner* — Garrett Evans
(74) *Attorney, Agent, or Firm* — Harness, Dickey & Pierce, P.L.C.

(57) ABSTRACT

A method of operating an air conditioning system includes changing output of the compressor based on a temperature limit of the evaporator. The temperature limit is one of a predetermined fixed temperature limit and a variable temperature limit. The method also includes determining the variable temperature limit by determining a target air outlet temperature for conditioned air in a control space, detecting an actual evaporator temperature, calculating a difference between the target air outlet temperature and the actual evaporator temperature, finding a predetermined first temperature adjustment that correlates to the difference, finding a predetermined second temperature adjustment that correlates to another condition, and calculating the variable temperature limit by adjusting the fixed temperature limit by one of the first and second temperature adjustments.

17 Claims, 3 Drawing Sheets

COOLING SYSTEM COMPRESSOR WITH VARIABLE OPERATING RANGE

FIELD

The present disclosure relates to a cooling system compressor and, more particularly, to a cooling system with a variable operating range.

BACKGROUND

This section provides background information related to the present disclosure which is not necessarily prior art.

A cooling system (i.e., air conditioning system or refrigeration cycle) typically includes a compressor, a condenser, an expansion valve assembly, and an evaporator. The cycle also includes a plurality of conduits that fluidly connect the compressor, condenser, expansion valve assembly, and evaporator. A refrigerant flows through the conduits and through the compressor, condenser, expansion valve assembly, and evaporator cyclically, changing temperature and pressure through the cycle. Moreover, air flows past the evaporator to be cooled, and this cooled air can be used to cool a control space (e.g., a passenger compartment of a vehicle, a building, etc.). Also, air flows past the condenser to be heated.

In many cooling systems, the compressor operates as long as the evaporator temperature (e.g., temperature at an evaporator fin) is within a fixed temperature range. For instance, the compressor remains ON as long as the actual evaporator temperature is between an upper limit and a lower limit. If the actual evaporator temperature is outside the upper or lower limits, then the compressor automatically turns OFF. This approach can avoid freezing of the evaporator.

The following discloses a cooling system with a compressor that can operate according to variable evaporator temperature limits. This approach can improve efficiency of the cooling system in some conditions.

SUMMARY

This section provides a general summary of the disclosure, and is not a comprehensive disclosure of its full scope or all of its features.

A method of operating an air conditioning system having a compressor and an evaporator that are operably connected is disclosed. The method includes changing output of the compressor based on a temperature limit of the evaporator. The temperature limit is one of a predetermined fixed temperature limit and a variable temperature limit. The method also includes determining the variable temperature limit by determining a target air outlet temperature for conditioned air in a control space, detecting an actual evaporator temperature, calculating a difference between the target air outlet temperature and the actual evaporator temperature, finding a predetermined first temperature adjustment that correlates to the difference, finding a predetermined second temperature adjustment that correlates to another condition, and calculating the variable temperature limit by adjusting the fixed temperature limit by one of the first and second temperature adjustments.

An air conditioning system that cools a control space is also disclosed. The system includes an evaporator having a temperature sensor that detects an actual evaporator temperature. The system also includes a compressor that is operably coupled to the evaporator. Furthermore, the system includes a controller that changes output of the compressor based on a comparison between the actual evaporator temperature and a temperature limit. The temperature limit is one of a predetermined fixed temperature limit and a variable temperature limit. The controller is operable to determine a target air outlet temperature for conditioned air in the control space, calculate a difference between the target air outlet temperature and the actual evaporator temperature, find a predetermined first temperature adjustment that correlates to the difference, find a predetermined second temperature adjustment that correlates to another condition, and calculate the variable temperature limit by adjusting the fixed temperature limit by one of the first and second temperature adjustments.

Furthermore, a method of operating an air conditioning system of a vehicle is disclosed, wherein the air conditioning system has a compressor and an evaporator that are operably connected, and wherein the vehicle includes an engine and a windshield. The method includes turning the compressor ON and OFF based on a comparison of an actual evaporator temperature and a temperature limit. The temperature limit is one of a predetermined fixed temperature limit and a variable temperature limit. The method includes determining the variable temperature limit by determining a target air outlet temperature for conditioned air in a control space, wherein the target air outlet temperature based on an ambient temperature outside the control space, a user setting of a desired control space air temperature, an actual air temperature inside the control space, and a sun load on the control space. The variable temperature limit is also determined by detecting the actual evaporator temperature calculating a difference between the target air outlet temperature and the actual evaporator temperature, finding a predetermined first temperature adjustment that correlates to the difference, finding a predetermined second temperature adjustment that correlates to the ambient temperature outside the control space, applying a time constant to a lesser of the first and second temperature adjustment, and calculating the variable temperature limit by adjusting the fixed temperature limit by the time-constant-applied lesser of the first and second temperature adjustment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
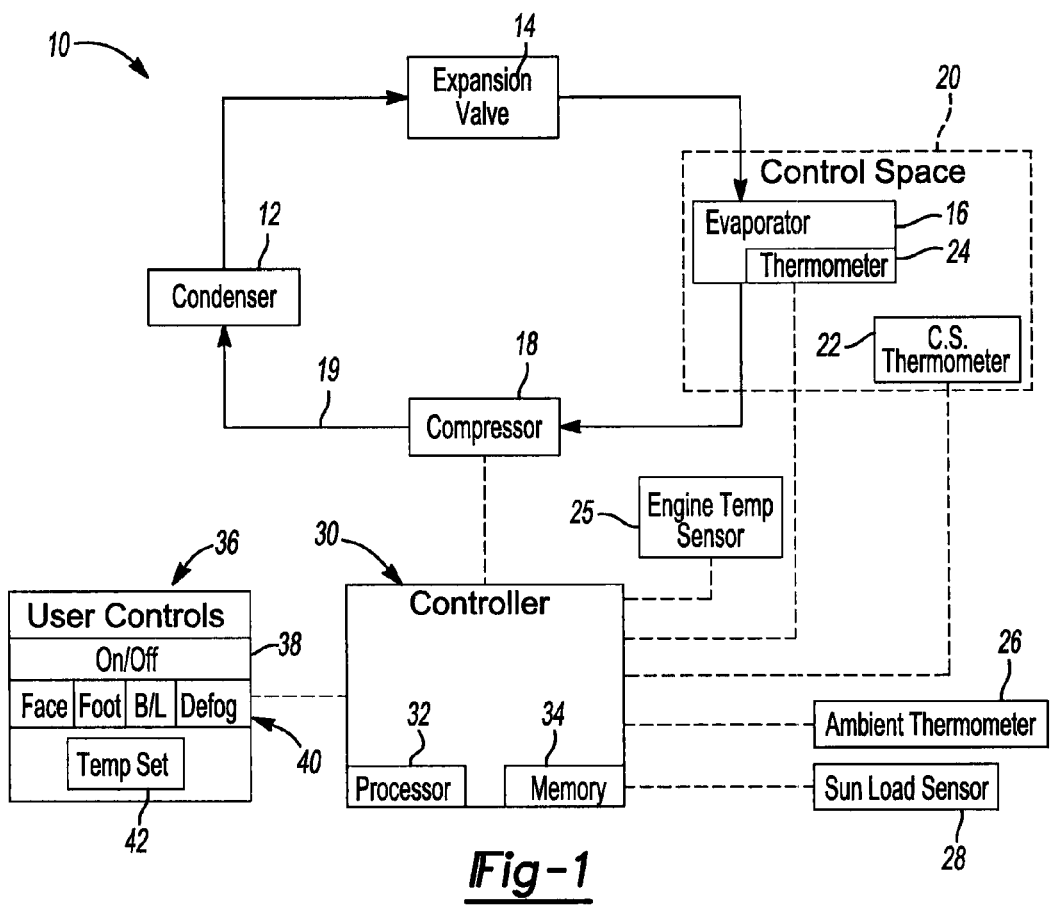
FIG. 1 is a schematic illustration of a cooling system according to various exemplary embodiments of the present disclosure.

Referring initially to FIG. 1, a cooling system 10 is illustrated according to various exemplary embodiments. As shown, the cooling system 10 can include a condenser 12, an expansion valve 14, an evaporator 16, a compressor 18, and a plurality of conduits 19 (e.g., pipes, tubes, etc.). In some ways, the cooling system 10 can operate similar to known cooling systems. Specifically, a refrigerant or coolant (e.g. Freon, R-410A, etc.) can flow through the conduits 19 and through the compressor 18, condenser 12, expansion valve 14, and evaporator 16 cyclically, changing temperature and pressure through the system 10. In some embodiments, the evaporator 16 can include a plurality of fins (not shown) over which air flows to be cooled, and this cooled air is introduced into a control space 20 (indicated in FIG. 1 by a box with broken lines) to thereby cool the control space 20. Also, air can flow past the condenser 12 to be heated to remove heat therefrom.

The cooling system 10 can be suitable for use in a vehicle (e.g., car, van, etc.), in a building, or in any other area. For purposes of discussion, the cooling system 10 will be discussed as if it is incorporated within a vehicle, and the control space 20 will be discussed as a passenger compartment of the vehicle.

The system 10 can include a control space temperature sensor 22. The sensor 22 can include a thermometer, a thermister, a thermocouple, or any other suitable sensor 22 that can detect the actual air temperature within the control space 20.

The system 10 can further include an evaporator temperature sensor 24. The sensor 24 can include a thermometer, a thermister, a thermocouple, or any other suitable sensor 24 that can detect the actual temperature at the evaporator 16, detect the temperature of the air passing over and cooled by the evaporator 16, etc. The temperature sensor 24 can be coupled directly to an outer surface of one of the fins to thereby determine the actual temperature of the evaporator 16. Also, in some embodiments, the temperature sensor 24 can be disposed within the airstream passing over the evaporator 16 to thereby detect the temperature in the airstream.

The system 10 can additionally include an engine temperature sensor 25. The sensor 25 can be of any suitable type (e.g., thermometer, thermister, etc.) for detecting the temperature of the engine. The sensor 25 can detect the temperature of the engine in any suitable fashion. For instance, the sensor 25 can detect the temperature of the engine coolant at any suitable location relative to the engine (e.g., in a coolant jacket, adjacent a combustion chamber, or immediately downstream of the coolant jacket). As will be discussed in detail below, the sensor 25 can be used to ensure that the engine is warmed up and that it is at a state of relative equilibrium.

Moreover, the system 10 can further include an ambient temperature sensor 26. The sensor 26 can include a thermometer, a thermister, a thermocouple, or any other suitable sensor 26 that can detect an actual ambient temperature outside the control space 20.

Additionally, the system 10 can include a sun load sensor 28 that detects the sun load on the control space 20. In some embodiments, the sun load sensor 28 is light sensitive. Thus, as the control space 20 is exposed to more light (e.g., high sunlight levels), the sun load sensor 28 can detect increased sun load on the control space 20, and conversely, as the control space 20 is exposed to less light (e.g., low sunlight levels), the sun load sensor 28 can detect reduced sun load on the control space 20.

Still further, the system 10 can include a controller 30. The controller 30 can be a computerized device having a processor 32, a memory device 34 (RAM and/or ROM), computerized logic, other hardware and software, etc. The memory device 34 can have various data stored thereon in any suitable form, such as the graphical data represented in FIGS. 3-6 (described below). The controller 30 can be in communication with the thermal sensors 24, 22, 26, the sun load sensor 28, and the coolant temperature sensor 25 to gather respective data. Also, as will be discussed, the controller 30 can control operations of various components of the system 10, including the compressor 18 for operating the system 10. For instance, the controller 30 can control output of the compressor 18 (e.g., turn the compressor 18 ON and OFF, change the power consumption of the compressor 18, etc.) for operating the system 10 and maintaining the control space 20 at a desirable air temperature.

The controller 30 can be in communication with various user controls 36, which can be used by the user for inputting various control commands for operating the system 10. It will be appreciated that the user controls 36 can include buttons, knobs, sliders, switches, or any other input device for inputting the user's control commands.

For instance, the user controls 36 can include an ON/OFF switch 38 for manually turning the system 10 ON and OFF. The user controls 36 can also include a temperature setting control 42 for manually inputting a user-desired temperature for the control space 20. Furthermore, the user controls 36 can include blower controls 40. The blower controls 40 can include a switch for changing a blower speed. Also, the blower controls 40 can include switches for changing the mode or direction of airflow within the control space 20. For instance, the blower controls 40 can be used to direct air generally toward a passenger's face (face mode), toward the passenger's feet (feet mode), toward both the face and feet (bi-level mode), and/or toward the windshield or windscreen (defog or defrost mode). It will be appreciated that the face, feet, and bi-level modes can be generally selected by the user during normal driving, and the defog mode can be generally selected by the user if the windshield or windscreen is fogged up, has accumulated frost, etc. It will also be appreciated that there could be several de-fog modes, such as a "foot-defog mode" in which air is directed to both the user's feet and windshield, and a "defog mode" in which air is primarily directly only to the windshield. The air-conditioning system can also include a "purge mode" or "initialization mode," in which air is substantially supplied only to the feet of the user, and which occurs upon initial startup of the system 10.

Figure 3:
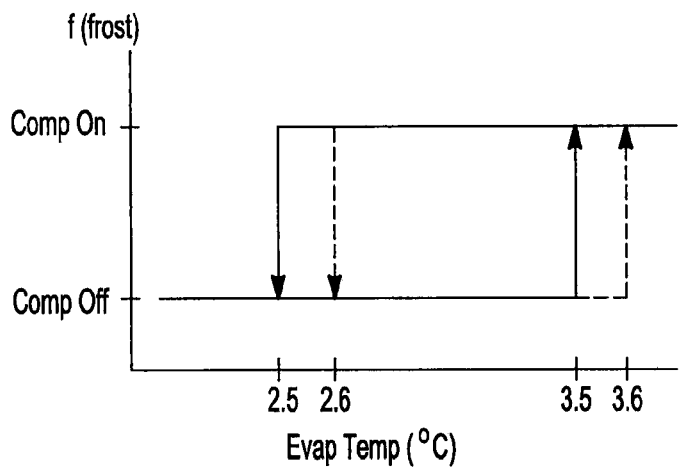
FIG. 3 is a graph of evaporator temperature limits for determining operation of a compressor in the cooling system of FIG. 1.

As will be discussed, the controller 18 can automatically control the compressor 18 according to a number of variables. For instance, the controller 18 can change the output of the compressor based on temperature limits of the evaporator 16 (i.e., based on a comparison between the actual evaporator temperature detected by the sensor 24 and one or more temperature limits). These temperature limits can be saved on the memory device 34 of the controller 30. For instance, FIG. 3 represents various temperature limits, including predetermined fixed temperature limits (represented by solid lines) and variable temperature limits (represented by broken lines).

The fixed temperature limits can be predetermined by testing under various driving conditions and saved on the memory device 34. In the embodiments shown in FIG. 3, a fixed lower limit can be set at 2.5° C., and a fixed upper limit can be set at 3.5° C. (It will be appreciated that these fixed lower and upper limits can have any suitable value).

The variable temperature limits (shown in broken lines) can be calculated by the controller 30 by adjusting the fixed temperature limits in a manner to be discussed. Specifically, in the embodiment of FIG. 3, the lower fixed temperature limit of 2.5 is adjusted by 0.1° C. such that the variable lower temperature limit is 2.6° C., and the upper fixed temperature limit 3.5° C. is adjusted by 0.1° C. such that the variable upper temperature limit is 3.6° C. It will be appreciated that the amount of adjustment can have any suitable value. It will also be appreciated that the variable temperature limits can be less than the respective fixed temperature limit.

Thus, the controller 30 can turn the compressor 18 ON if the actual evaporator temperature detected by sensor 24 is between these upper and lower limits, and the controller 30 can turn the compressor 18 OFF if the actual evaporator temperature is above the upper limit or below the lower limit. Specifically, under certain conditions, the controller 30 can turn the compressor 18 ON if the actual evaporator temperature is between the fixed limits (i.e., between 2.5 and 3.5° C.). This can reduce the likelihood of the evaporator freezing. Under other conditions, the controller 30 can turn the compressor 18 ON if the actual evaporator temperature is between the variable limits (i.e., between 2.6 and 3.6° C.). This can reduce the likelihood of the evaporator freezing and also provide for improved efficiencies and fuel savings.

Figure 2:
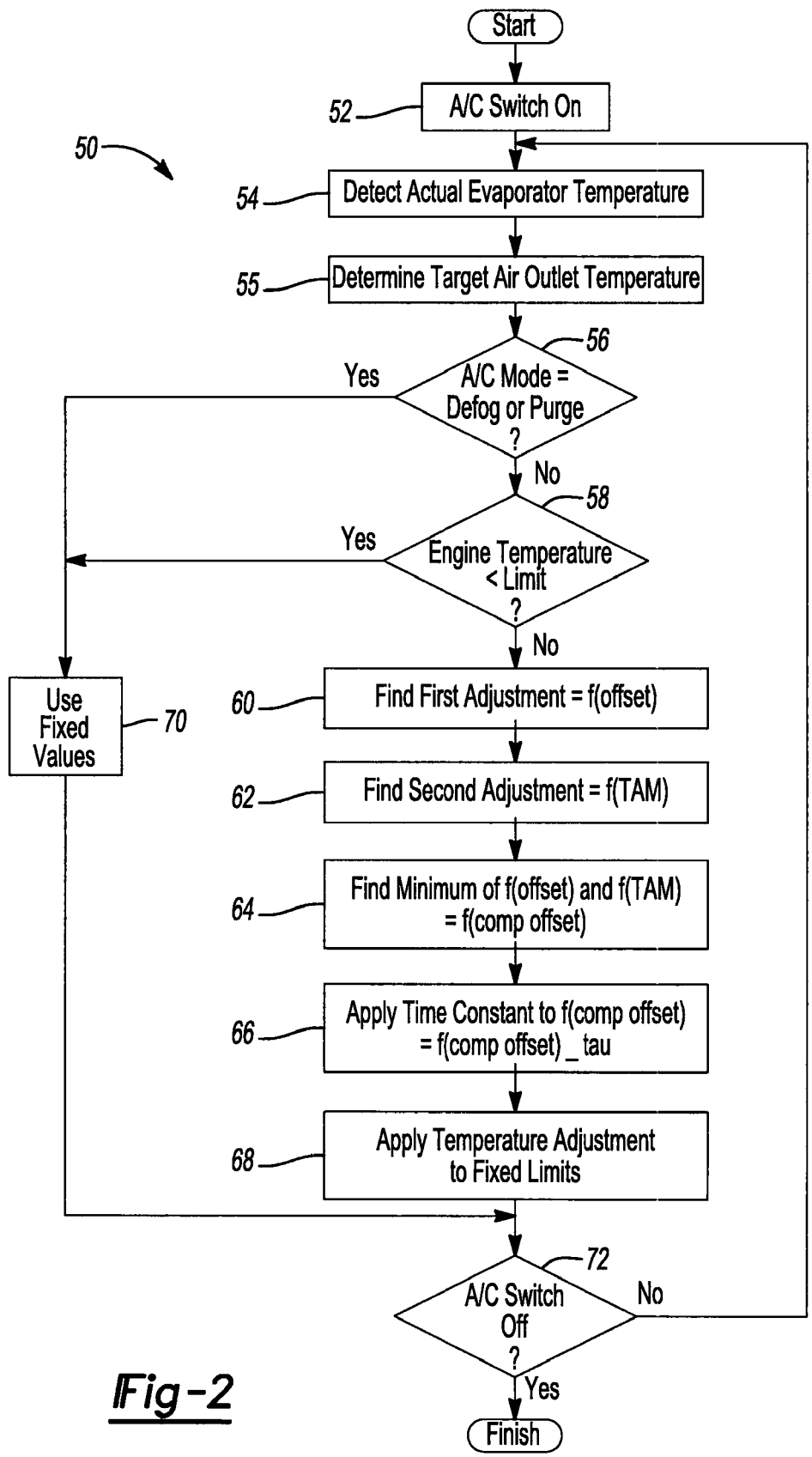
FIG. 2 is a flowchart illustrating a method of operating the cooling system of FIG. 1.

Referring now to FIG. 2, a method 50 of operating the cooling system 10 will be discussed according to various exemplary embodiments. As shown, the method 50 can begin in step 52, in which the air conditioning system 10 has been turned on by the user.

Then, in block 54, the evaporator temperature sensor 24 detects the actual temperature of the evaporator 16. Block 54 can include taking raw temperature data or can include filtering the temperature data gathered by the sensor 24. In the latter case, the temperature data can be filtered by detecting the temperature several times and averaging the results.

Subsequently, in block 55, a target air outlet temperature can be determined. In other words, the controller 30 can determine how cold the air entering the control space 20 should be. The target air outlet temperature can be determined according to programmed logic (e.g., an algorithm) loaded on the controller 30. The processor 32 can compute the target air outlet temperature according to one or more factors. For instance, this target air outlet temperature can be determined according to the user's desired control space air temperature (i.e., the temperature set using the temperature setting controls 42). The target air outlet temperature can also be determined according to the ambient temperature detected by the sensor 26, the actual temperature inside the control space 20 detected by the sensor 22, and/or the sun load detected by the sensor 28. One or more of these variables and/or other variables can be used in a known algorithm by the processor 32 to determine the target air outlet temperature in block 55.

Next, in block 56, the blower mode of the system 10 is determined. Specifically, it can be determined whether the blower control 40 is set to defog mode or purge mode (described above). If the blower control 40 is set to face, feet, or bi-level (i.e., block 56 answered negatively), then block 58 follows; however, if the blower control 40 is set to defog or purge mode (block 58 answered affirmatively), then block 70 follows.

In block 58, the engine temperature sensor 25 detects the temperature of the engine, and it is determined whether the coolant temperature is less than a predetermined temperature limit. The limit can have any suitable value. In some embodiments, the limit can be between approximately seventy and ninety degrees Celsius (70° C.-90° C.). Also, in some embodiments, the limit can be approximately eighty degrees Celsius (80° C.). If the temperature detected by the sensor 25 is above the limit (block 58 answered negatively), then block 60 follows; however, if the temperature detected by the sensor 25 is below the limit (block 58 answered affirmatively), then block 70 follows.

Figure 4:
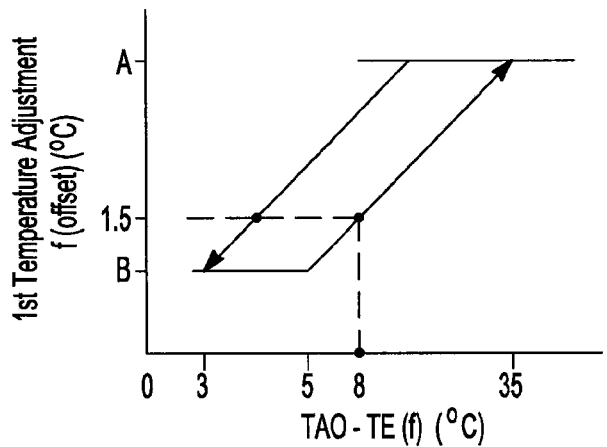
FIG. 4 is a graph of first temperature adjustment for determining operation of the compressor in the cooling system of FIG. 1.

In block 60, the controller 30 finds a first temperature adjustment for adjusting the fixed temperature limit described above with respect to FIG. 3. The first temperature adjustment can be a predetermined value included in a lookup table, in a graph, or otherwise saved on the memory device 34. For instance, as shown in FIG. 4, the processor 32 can calculate the difference between the target air outlet temperature (TAO) (determined in block 55) and the actual evaporator temperature (TE(f)) (detected in block 54). For instance, as shown in FIG. 4, the target air outlet temperature (TAO) can be 15 degrees, and the actual evaporator temperature (TE(f)) can be approximately 7 degrees. Thus, according to the graph of FIG. 4, the difference between TAO and TE(f) would be 8° C., and the corresponding first temperature adjustment (f(offset)) would be approximately 1.5° C.

Figure 5:
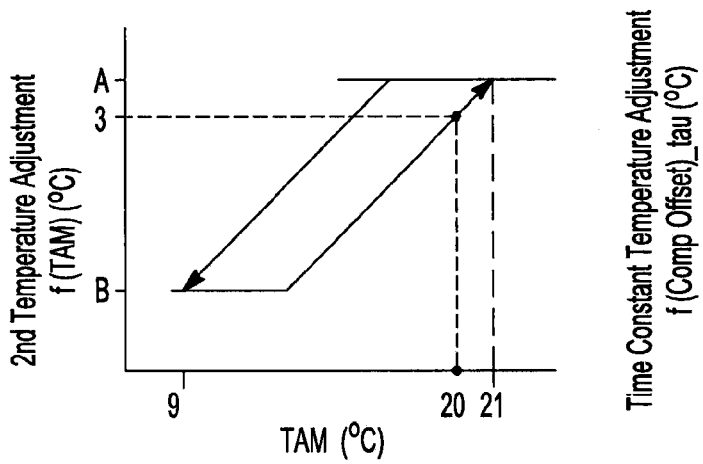
FIG. 5 is a graph of second temperature adjustment for determining operation of the compressor in the cooling system of FIG. 1.

Referring back to FIG. 2, the method 50 can continue in block 62. In block 62, the controller 30 finds a second temperature adjustment for adjusting the fixed temperature limit described above with respect to FIG. 3. The second temperature adjustment can be a predetermined value included in a lookup table, in a graph, or otherwise saved on the memory device 34. More specifically, the second temperature adjustment can be determined according to the ambient temperature detected by the sensor 26. Thus, as shown in FIG. 5, the ambient temperature sensor 26 could detect an ambient temperature of 20° C., and the corresponding second temperature adjustment (f(Tam)) would be approximately 3° C.

Subsequently, in block 64, the controller 30 compares the first temperature adjustment (found in block 60) and second temperature adjustment (found in block 62) to identify which is the lesser of the two. In the example embodiments given above, the first temperature adjustment is 1.5° C., and the second temperature adjustment is 3° C. Thus, the lesser of the two (f(CompOffset)) is the first temperature adjustment or 1.5° C.

Figure 6:
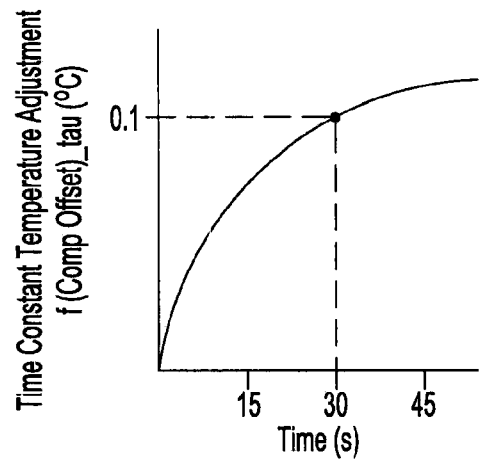
FIG. 6 is a graph of a time-constant-applied temperature adjustment for determining operation of the compressor in the cooling system of FIG. 1.

Next, in block 66, the controller 30 applies a time constant to the temperature adjustment identified in block 64. In some embodiments, the time constant is applied according to a lookup table, a graph, or other data saved on the memory device 34. Specifically, in the examples given above, block 64 resulted in a temperature adjustment of 1.5° C. Thus, FIG. 6 shows the temperature adjustment with applied time constant (f(CompOffset)_tau) for 1.5° C. At a time constant of 30 seconds, the temperature adjustment with applied time constant (f(CompOffset)_tau) is equal to 0.1° C. (It will be appreciated that the time constant applied could be other than 30 seconds.)

Then, in block 68, the fixed temperature limits are adjusted by f(CompOffset)_tau. Thus, the lower fixed limit of 2.5° C. of FIG. 3 is adjusted (increased) to 2.6° C., and the upper fixed limit of 3.5° C. is adjusted (increased) to 3.6° C. Thus, as discussed above, if the actual evaporator temperature detected by the sensor 24 is between 2.6° C. and 3.6° C., the compressor 18 will remain ON, but the compressor 18 will shut OFF if the actual evaporator temperature is outside the 2.6-3.6° C. temperature range.

Referring back to FIG. 2, if block 56 or block 58 is answered affirmatively, then the fixed temperature limits are used. Thus, if the actual evaporator temperature detected by the sensor 24 is between 2.5° C. and 3.5° C., the compressor 18 will remain ON, but the compressor 18 will shut OFF if the actual evaporator temperature is outside the 2.5-3.5° C. temperature range. Accordingly, if the air conditioning system 10 is in defogging or purge mode (block 56 answered affirmatively) or the engine has not sufficiently warmed up (block 58 answered affirmatively), the method 50 will not adjust the temperature limits.

As shown in FIG. 2, the previous blocks will repeat in a loop until the air conditioning system 10 is switched off. Specifically, in block 72, it is determined whether the ON/OFF switch 38 has been switched OFF. If the switch 38 remains ON, then the method 50 repeats to block 54, but if the switch 38 is moved OFF, then the method 50 is finished.

Accordingly, the system 10 and method 50 discussed above can reduce compressor usage and, hence, improve fuel economy. Also, the temperature limits can be adjusted repeatedly, depending on instant conditions. Moreover, the driving conditions can vary the temperature limits based on loads on the system 10, and the system 10 can quickly react to changes in driving conditions.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of operating an air conditioning system having a compressor and an evaporator that are operably connected, the method comprising:
    changing output of the compressor based on a temperature limit of the evaporator, the temperature limit being one of a predetermined fixed temperature limit and a variable temperature limit; and
    determining the variable temperature limit by:
        determining a target air outlet temperature for conditioned air in a control space,
        detecting an actual evaporator temperature,
        calculating a difference between the target air outlet temperature and the actual evaporator temperature,
        finding a predetermined first temperature adjustment that correlates to the difference,
        finding a predetermined second temperature adjustment that correlates to another condition;
        calculating the variable temperature limit by adjusting the fixed temperature limit by one of the first and second temperature adjustments, and
    determining if an engine temperature is below a predetermined limit, and wherein changing output of the compressor includes changing output of the compressor based on predetermined fixed temperature limit instead of the variable temperature limit when the engine temperature is below the predetermined limit.

2. The method of claim 1, wherein changing output of the compressor includes turning the compressor ON and OFF based on the temperature limit of the evaporator.

3. The method of claim 1, wherein determining the target air outlet temperature includes at least one of detecting an ambient temperature outside the control space, detecting a user setting of a desired control space air temperature, detecting the actual air temperature inside the control space, and detecting a sun load on the control space.

4. The method of claim 1, wherein finding the second temperature adjustment includes finding the second temperature adjustment that correlates to an ambient temperature outside the control space.

5. The method of claim 4, further comprising finding the lesser of the first and second temperature adjustments, and wherein calculating the variable temperature limit includes applying the lesser of the first and second temperature adjustments to the fixed temperature limit.

6. The method of claim 5, further comprising applying a time constant to the lesser of the first and second temperature adjustments.

7. The method of claim 1, further comprising determining if the air conditioning system is providing defogging air to a windshield, and wherein changing output of the compressor includes changing output of the compressor based on the predetermined fixed temperature limit instead of the variable temperature limit when the air conditioning system is providing defogging air to the windshield.

8. The method of claim 1, wherein changing output of the compressor includes changing output of the compressor based on an upper temperature limit of the evaporator and a lower temperature limit of the evaporator, the upper temperature limit being one of a predetermined fixed upper temperature limit and a variable upper temperature limit, the lower temperature limit being one of a predetermined fixed lower temperature limit and a variable lower temperature limit, and further comprising determining the variable upper temperature limit and determining the variable lower temperature limit.

9. The method of claim 8, wherein changing output of the compressor includes turning the compressor ON when an actual evaporator temperature is substantially between the upper and lower temperature limits and turning the compressor OFF when the actual evaporator temperature is substantially outside the upper and lower temperature limits.

10. An air conditioning system that cools a control space comprising:
    an evaporator having a temperature sensor that detects an actual evaporator temperature;
    a compressor that is operably coupled to the evaporator; and
    a controller that changes output of the compressor based on a comparison between the actual evaporator temperature and a temperature limit, the temperature limit being one of a predetermined fixed temperature limit and a variable temperature limit, the controller operable to determine a target air outlet temperature for conditioned air in the control space, calculate a difference between the target air outlet temperature and the actual evaporator temperature, find a predetermined first temperature adjustment that correlates to the difference, find a predetermined second temperature adjustment that correlates to another condition, and calculate the variable temperature limit by adjusting the fixed temperature limit by one of the first and second temperature adjustments, and
    determining if an engine temperature is below a predetermined limit, and wherein changing output of the compressor includes changing the output of the compressor based on the predetermined fixed temperature limit instead of the variable temperature limit when the engine temperature is below the predetermined limit.

11. The air conditioning system of claim 10, wherein the controller turns the compressor ON and OFF based on the comparison between the actual evaporator temperature and the temperature limit of the evaporator.

12. The air conditioning system of claim 10, further comprising an ambient temperature sensor that detects an ambient temperature outside the control space, a user control with which a user can set a desired control space air temperature, a control space temperature sensor that detects an actual air temperature inside the control space, and a sun load sensor that detects a sun load on the control space, and wherein the controller determines the target air outlet temperature based on the ambient temperature, the desired control space air temperature, the actual air temperature inside the control space, and the sun load.

13. The air conditioning system of claim 10, wherein the controller finds the second temperature adjustment correlating to an ambient temperature outside the control space.

14. The air conditioning system of claim 13, wherein the controller is operable to find the lesser of the first and second temperature adjustments, and the controller is operable to apply the lesser of the first and second temperature adjustments to the fixed temperature limit.

15. The air conditioning system of claim 14, wherein the controller is operable to applying a time constant to the lesser of the first and second temperature adjustments.

16. The air conditioning system of claim 10, wherein the controller is operable to determine if defogging air is being provided to a windshield, and wherein the controller is operable to change output of the compressor based on the predetermined fixed temperature limit instead of the variable temperature limit when the air conditioning system is providing defogging air to the windshield.

17. The air conditioning system of claim 10, wherein the controller is operable to turn the compressor ON if the actual evaporator temperature is approximately between an upper temperature limit and a lower temperature limit, and the controller is operable to turn the compressor OFF if the actual evaporator temperature is outside the upper temperature limit and the lower temperature limit, the upper temperature limit being one of a predetermined fixed upper temperature limit and a variable upper temperature limit, the lower temperature limit being one of a predetermined fixed lower temperature limit and a variable lower temperature limit.

* * * * *

UNITED STATES PATENT AND TRADEMARK OFFICE
CERTIFICATE OF CORRECTION

Page 1 of 1

PATENT NO.      : 8,682,527 B2
APPLICATION NO. : 13/076213
DATED           : March 25, 2014
INVENTOR(S)     : Sudha Senthil et al.

It is certified that error appears in the above-identified patent and that said Letters Patent is hereby corrected as shown below:

In the Claims

Col. 7, Claim 1, lines 39-40, delete "one of" and insert --switchable between--;

Col. 7, Claim 1, line 53, after "the" insert --predetermined--;

Col. 7, Claim 1, line 58, after "on" insert --the--;

Col. 8, Claim 10, lines 48-49, delete "one of" and insert --switchable between--;

Col. 8, Claim 10, line 58, after "the" insert --predetermined--;

Col. 8, Claim 10, line 62, after "changing" delete "the".

Signed and Sealed this
Eighth Day of July, 2014

Michelle K. Lee
*Deputy Director of the United States Patent and Trademark Office*